Nov. 5, 1968  A. PACCIARINI ETAL  3,409,491
METHOD AND APPARATUS FOR THE MANUFACTURE OF PNEUMATIC TIRES
Filed Nov. 30, 1964  5 Sheets-Sheet 5

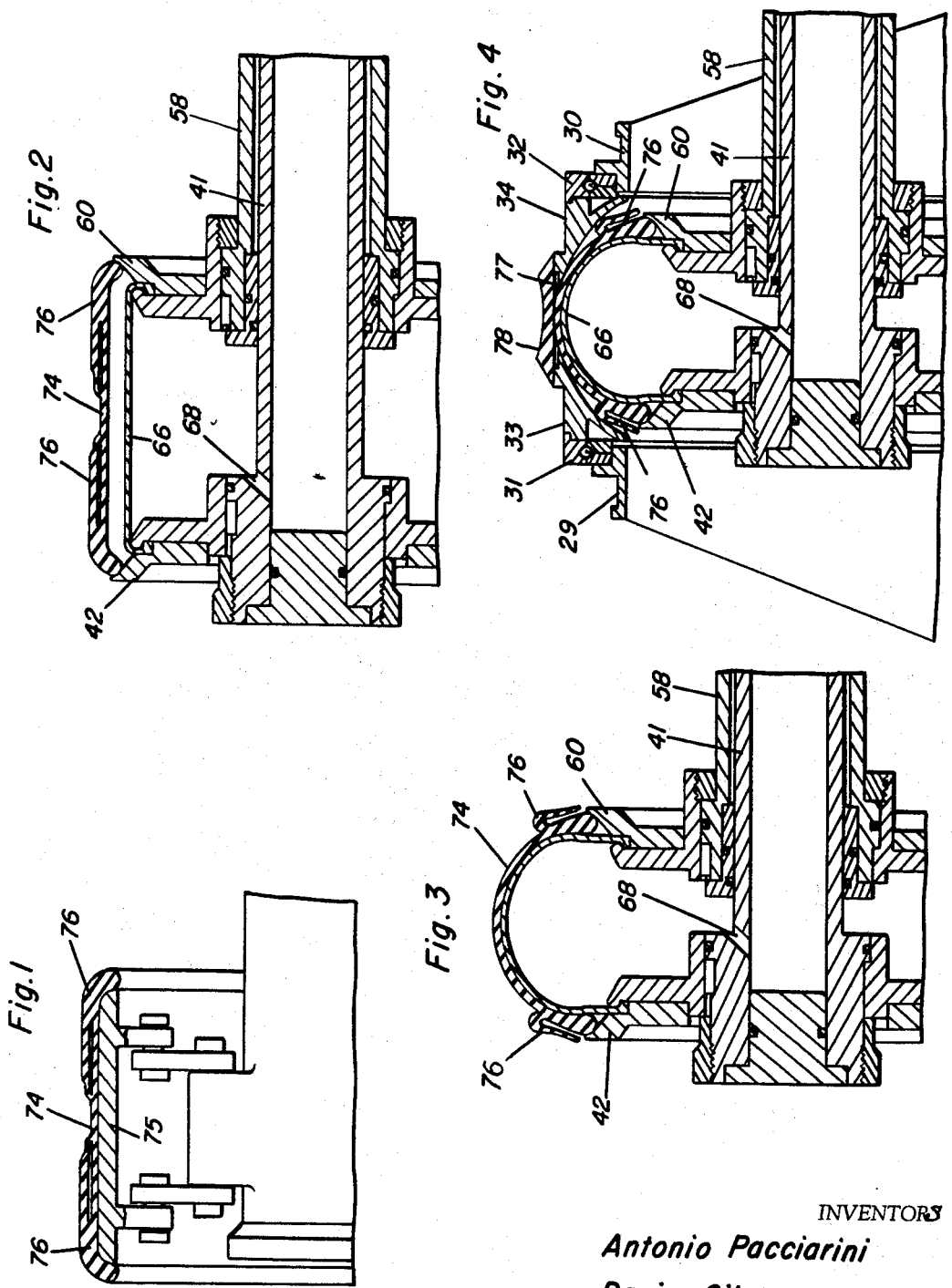

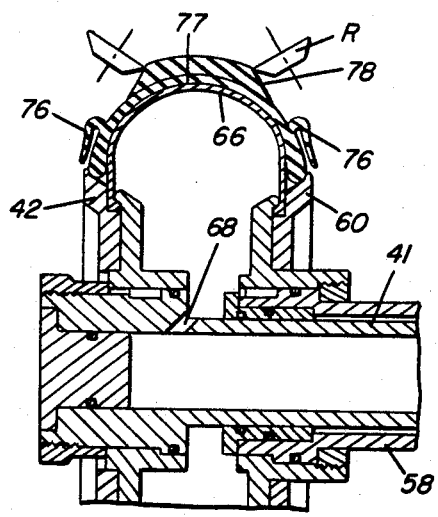
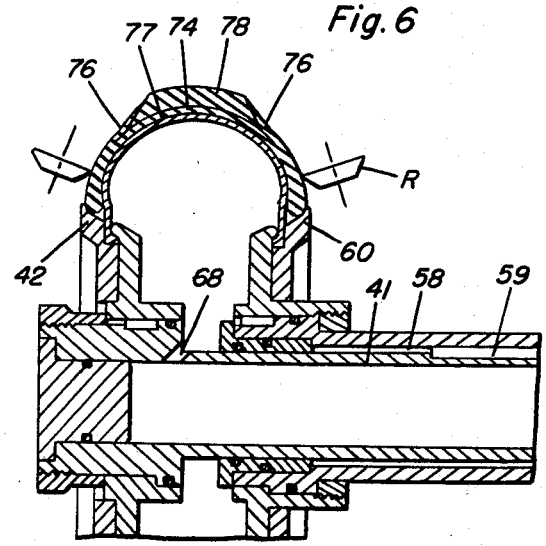
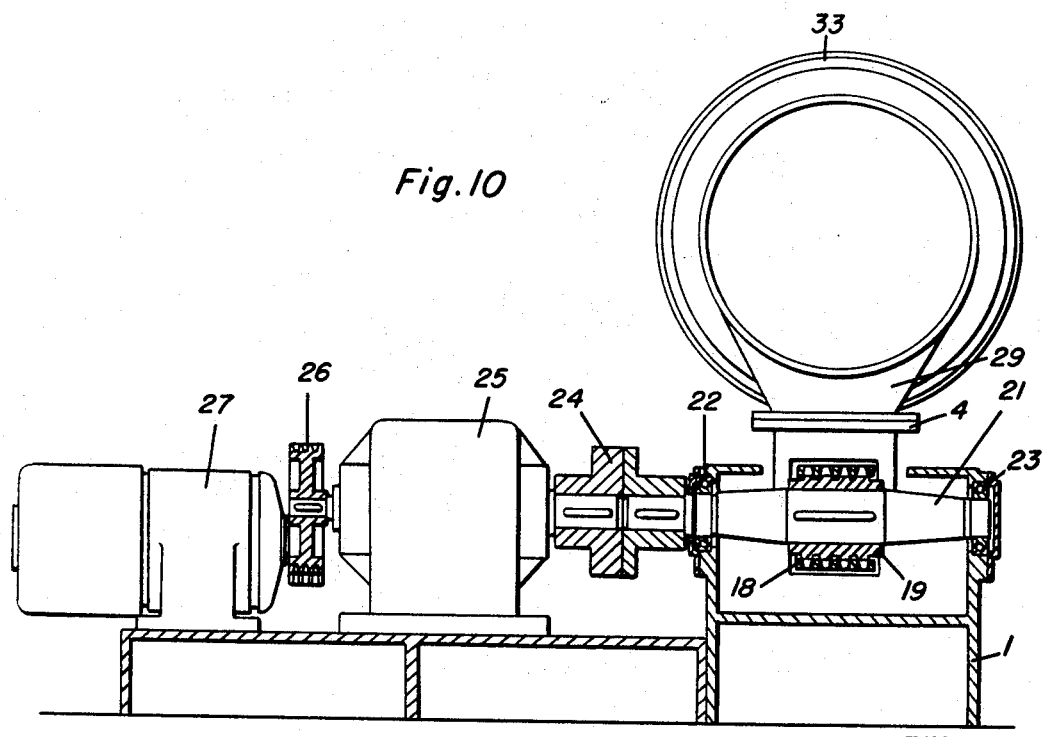

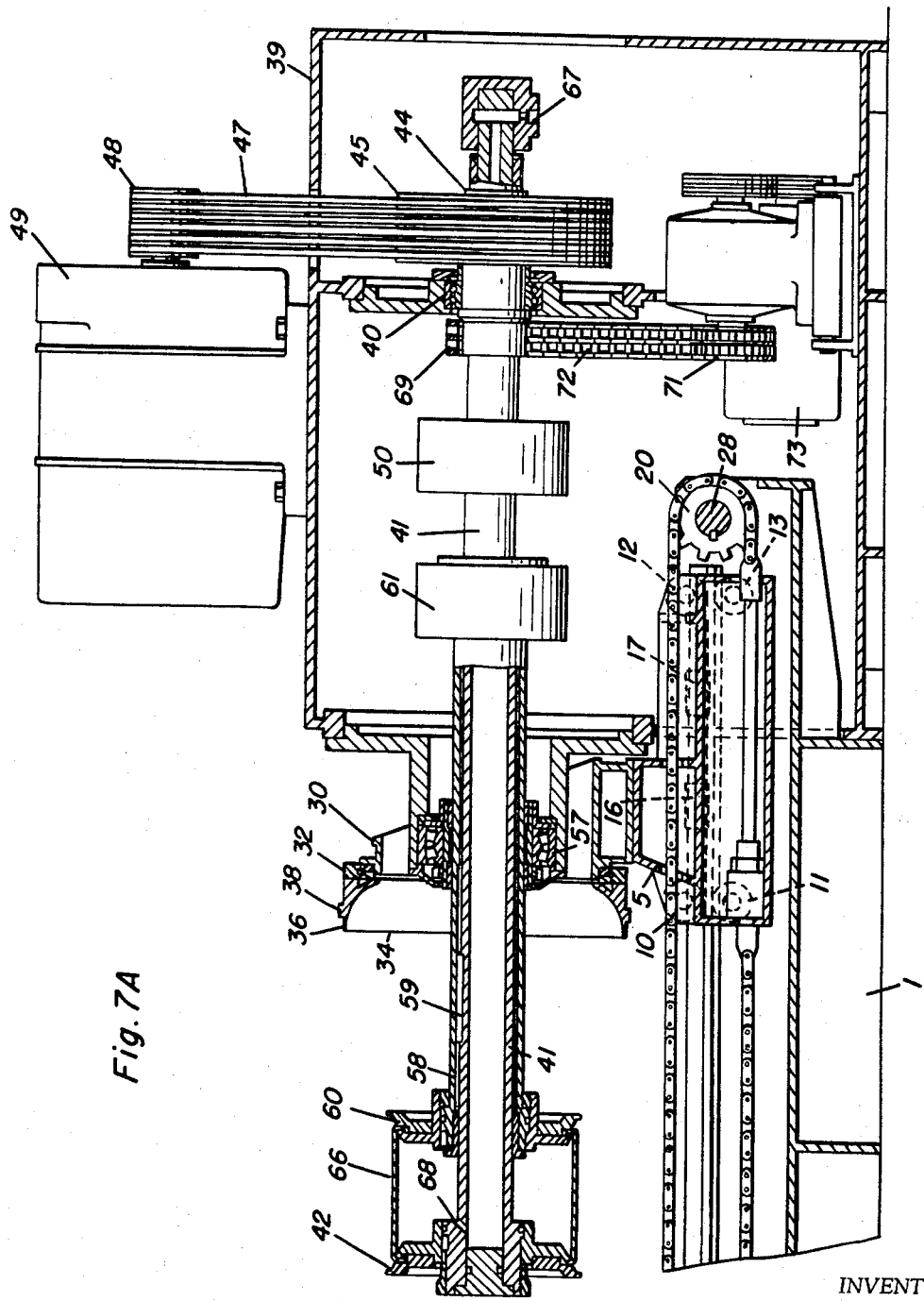

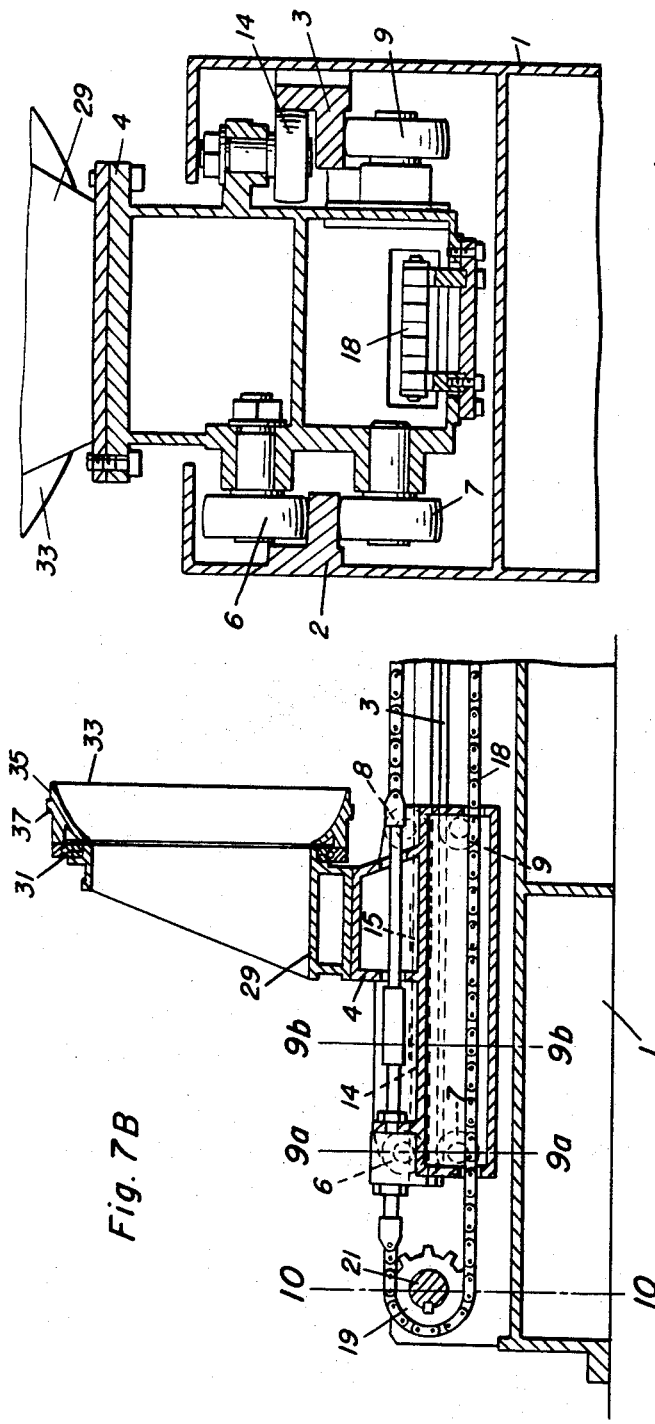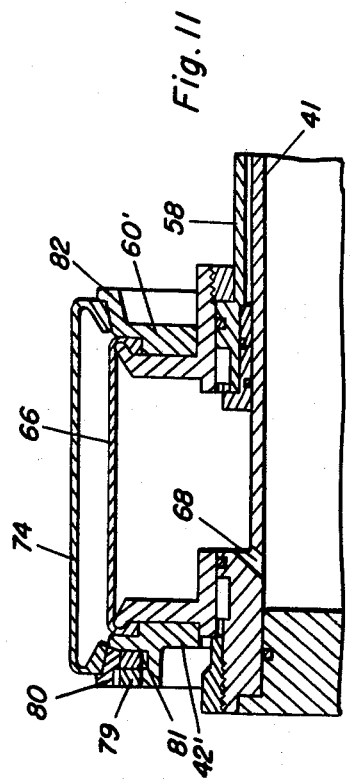

INVENTORS
Antonio Pacciarini
Dario Giletta
BY
Stevens, Davis, Miller & Mosher
ATTORNEYS United States Patent Office 3,409,491
Patented Nov. 5, 1968

3,409,491
METHOD AND APPARATUS FOR THE MANUFACTURE OF PNEUMATIC TIRES
Antonio Pacciarini and Dario Giletta, Milan, Italy, assignors to Pirelli S.p.A., Milan, Italy
Filed Nov. 30, 1964, Ser. No. 414,586
Claims priority, application Italy, Dec. 3, 1963, 24,819/63
14 Claims. (Cl. 156—126)

ABSTRACT OF THE DISCLOSURE

A method and apparatus for the manufacture of pneumatic tires wherein a carcass is built up on a rigid drum and the sidewalls are applied to the carcass on said drum. The carcass is then transferred to an expansible drum and shaped to a toroidal form, after which a reinforcing structure and a tread band are applied to complete the tire.

The present invention generally relates to the manufacture of pneumatic tires of any size, having deformable or rigid beads provided with one or more bead cores and substantially inextensible elements, and more particularly relates to pneumatic tires provided with ring-shaped reinforcing structures disposed either between the carcass and the tread or incorporated in the tread.

As is well known to those skilled in the art, these types of tires, up to the present have been built upon machines comprising an expansible drum constituted by an elastic membrane and by two rigid reciprocally movable end walls. One of these machines is described in United States Patents Nos. 2,814,330 and 2,814,331. According to the method carried out by means of this machine, the carcass was initially built up on an expansible drum in cylindrical form. Then, it was brought to a toroidal shape by reciprocally and simultaneously approaching, symmetrically with respect to the drum midline, the end walls of the drum and two bells having an outer diameter corresponding to the greatest outer diameter of the shaped carcass, and by injecting compressed air inside the drum. A ring-shaped reinforcing structure was then applied on the outer surface of the bells and was caused to adhere to the central annular band of the carcass, disposed between the edges of the bells that faced each other slightly spaced apart. The tread band was then applied on the so formed structure. The reinforcing structure and the tread band were stitched on the carcass, after the outward displacement of the bells, and finally the sidewalls were applied by hand to the then pre-shaped tire.

This method, however, presented certain problems for the following reasons:

(a) The manufacture of the carcass on a drum provided with an expansible elastic membrane failed to ensure true correspondence between the development of the carcass between the two beads and the pre-established development of the same;

(b) It was not possible to carry out an efficient stitching of the elements constituting the carcass, since the surface of the expansible drum, when it has a cylindrical shape, is slightly yieldable, and the pressure in its inside is consequently low; and (c) The application of the strips corresponding to the tire sidewalls was particularly troublesome, since it has to be carried out by hand on annular surfaces of decreasing diameter and in subsequent times at the two sides of the tire.

Briefly summarized, the present invention includes a method of fabricating pneumatic tires provided with substantially inextensible elements, according to which the carcass plies and the reinforcing bead cores are applied on a collapsible rigid drum, as for instance that of the machine described in United States Patent No. 2,878,856. Then, the edges of the carcass plies are turned up about the bead cores, and the strips constituting the sidewalls are applied to this assembly with the interposition of strips of a non-adhesive material between the carcass and the sidewalls so that these latter strips may be covered by the portion of the sidewalls nearest the midline of the carcass, but may extend partially therefrom. After each application of the plies and after the turning up of their edges, the plies are subjected to a stitching operation. Then the so manufactured carcass is removed from the collapsible rigid drum and is assembled on a second drum provided with an expansible membrane and with rigid end walls which may be reciprocally and symmetrically approached and spread apart with respect to the drum midline. Next, the carcass is brought to a toroidal shape, in which the outer diameter is less than the final diameter after complete shaping, while the distance between the beads is greater than the final distance after shaping, by injecting compressed air inside the drum and by reciprocally and symmetrically approaching the drum end walls with respect to the drum midline. The strips corresponding to the tire sidewalls are turned up on themselves towards the axis of rotation of the drum, and the underlying strips of non-adhesive material are detached. The partially shaped carcass is enclosed within two bells, the outer diameter of which corresponds to the greatest outer diameter of the carcass after shaping, by leaving a space between said bells, and then the shaping of the carcass is completed. Next, a ring-shaped reinforcing structure is applied on the outer surface of the bells, causing it to adhere to the midline of the carcass, and the tread band is applied on the assembly so formed. The bells are displaced outwardly and the reinforcing structure and the tread band are stitched on the underlying carcass. Thereafter, the edges of the tread band are covered with the edges of the sidewalls which had been turned up on themselves, and the sidewalls are stitched.

On the other hand, if in the finished tire, the sidewalls are to be partially covered by the tread band, the process may be simplified, since the carcass plies and the reinforcing bead cores are applied on a collapsible rigid drum, the edges of the plies are turned up about these cores, and the strips of the sidewalls are applied. After each application of the plies, and after the turning up of their edges, the plies are subjected to a stitching operation. Then the so obtained carcass is removed from the collapsible rigid drum and is assembled on a second drum provided with an expansible membrane and with rigid end walls which may be reciprocally and symmetrically approached and spread apart with respect to the drum midline. The carcass is then brought to its final toroidal shape by injecting compressed air inside the drum and by reciprocally and symmetrically approaching the drum end walls with respect to the drum midline. At the same time the carcass being shaped is enclosed within two bells, the outer diameter of which corresponds to the greatest outer diameter of the carcass after shaping, but leaving a preselected space between the bells. The ring-shaped reinforcing structure is then applied on the outer surface of the bell, causing it to adhere to the midline of the carcass, and the tread band is applied on the assembly so formed. The bells are displaced outwardly and the reinforcing structure and the tread band are stitched on the underlying carcass to partially cover the tire sidewalls.

A further object of the present invention is the provision of a machine, which constitutes an improvement over that described in United States Patent Nos. 2,814,330 and 2,814,331, and which has been particularly devised and constructed to carry out the second series of steps for manufacturing pneumatic tires according to the method of the invention, so as to take into account at the same time the still growing requirement to obtain tires strictly symmetrical with respect to their mid-circumferential plane, and in which the ring-shaped structure and the tread are perfectly centered with respect to said plane, and to achieve the maximum possible reduction in working time.

The foregoing and other objects and features of the present invention will be more clearly apparent from the following description of one of its embodiments, given by way of example and made with reference to the attached drawings, in which:

FIGS. 1 to 6 illustrate the various steps for the manufacturing of pneumatic tires according to the method of the present invention;

FIG. 7a is a longitudinal vertical section of a portion of the machine for carrying out the second series of steps for the manufacture of the tires;

FIG. 7b is also a longitudinal vertical section of the remaining portion of the machine partially illustrated in FIG. 7a;

FIG. 9 is a cross section of a detail of the machine illustrated in FIG. 7b, the left half of the figure corresponds to a section taken along plane 9a—9a and the right half to a section taken along plane 9b—9b;

FIG. 10 is a cross section taken along plane 10—10 of the machine shown in FIG. 7b; and FIG. 11 is a partial longitudinal section of an alternative embodiment of the drum of FIG. 1, particularly intended for the manufacture of pneumatic tires provided with indeformable beads.

Figure 8:
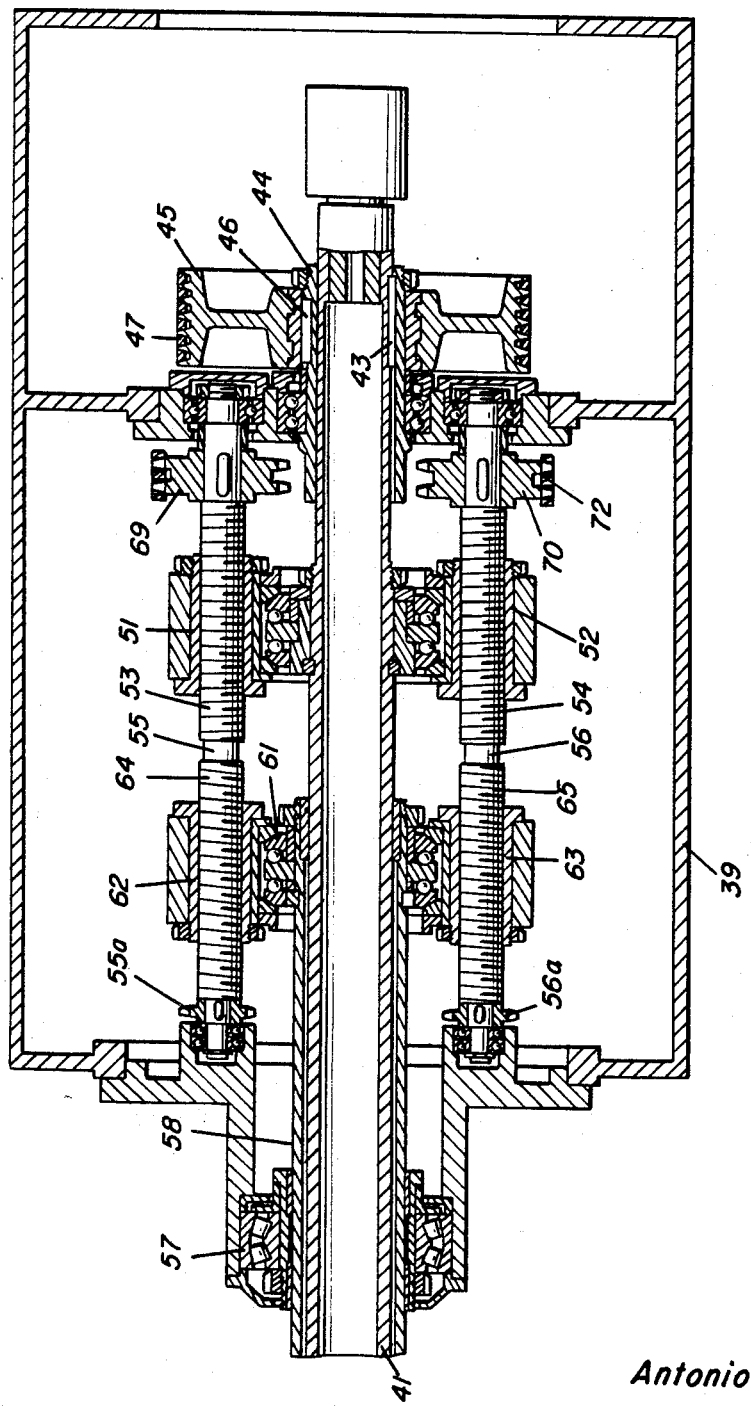
FIG. 8 is a partial longitudinal horizontal section of the machine of FIG. 7b.

The machine illustrated by FIGS. 7a–10 comprises a frame 1 to which are fastened rails 2 and 3. Two carriages 4 and 5, slidable in directions opposite to each other, are respectively mounted on the rails by pairs of wheels 6, 7, 8, 9 and 10, 11, 12, 13, each having a horizontal axis, and of pairs of wheels 14, 15 and 16, 17, each having a vertical axis.

Carriages 4 and 5 are connected at their ends with an endless chain 18 assembled on a sprocket wheel 19 and a transmission wheel 20. Sprocket wheel 19 is keyed on a shaft 21, rotatably assembled in the frame 1 by journal bearings 22 and 23, and connected by a joint 24 to a motor speed reducer 25 actuated by a reversible motor 27 through a belt transmission 26. Transmission wheel 20 is keyed on a shaft 28, also supported by the frame 1. Carried by carriages 4 and 5 are fixed supports 29 and 30, respectively, onto which are rotatably assembled, by means of ball bearings 31, 32, bells 33 and 34 which are respectively provided on their periphery with annular band 35, 36, and with a step 37, 38.

On a frame 39, by means of a journal bearing 40, there is assembled a hollow mandrel 41, at one end of which is fastened a frusto-conical cap 42, having a cavity flaring outwardly in a direction away from the bore of the mandrel 41. At the other end of mandrel 41 there is assembled, slidable in longitudinal direction by means of a key 43, a bushing 44 made integral with pulley 45 by means of a key 46. The pulley 45, through a belt transmission 47, is connected to a pulley 48 keyed on the shaft of a reversible motor 49.

At substantially its mid-portion, the mandrel 41 is connected, through thrust bearings 50, to nut screws 51 and 52 which engage respectively with threaded portions 53 and 54 of double-threaded shafts 55 and 56. Externally and coaxially of the mandrel 41, a second hollow mandrel 58 is assembled in the frame 39 by means of bearings 57 in such a way as to slide along the mandrel 41, but integral thereto during rotation by means of a key 59. At one end of the mandrel 58 there is fastened a frusto-conical cap 60, having a cavity directed towards the mandrel 58 and flaring outwardly in the same direction. At the other end, mandrel 58, by means of the thrust bearings 61, is connected to nut screws 62 and 63 which engage respectively with threaded portions 64 and 65 of the shafts 55 and 56.

Gears 55a and 56a are keyed respectively on shafts 55 and 56. These gears are actuated by suitable driving cams (not shown in the drawings for the sake of simplicity) to stop the rotation of shafts 55 and 56 which through nuts 51, 52 and 62, 63 causes sliding of spindles 41, 58 thus bringing the caps 42 and 60 to the pre-established distance.

The threads 64 and 65 are equal to the threads 53 and 54, but are threaded in opposite directions. To the inner faces of caps 42 and 60 there are fastened in a substantially air-tight manner the thickened edges of an expansible membrane 66 preferably provided on its outer surface with longitudinal knurling. The diameter corresponding to the edges of the membrane is considerably smaller than the diameter of the caps 42 and 60.

The inside of mandrel 41, by means of a port 67, is connected to a source of compressed air, not indicated in the figure, and at the other end, by means of a port 68, it is connected with the inner chamber defined by the membrane 66.

On the shafts 55 and 56 there are respectively keyed sprocket wheels 69 and 70 connected to each other and to a sprocket wheel 71 by means of a chain 72. The sprocket wheel 71 is keyed on the shaft of a motor speed reducer connected with a reversible motor 73.

The operation of the machine will now be described with reference to the various manufacturing steps illustrated in FIGS. 1 to 6. A carcass 74, built up on a conventional rigid drum 75 (see FIG. 1), and previously provided with sidewalls 76 and with strips of non-adhesive material, as for instance polyethylene, interposed between the carcass and the sidewalls, is removed from the rigid drum after the collapse of the latter, and is assembled on the expansible drum, constituted by the two end walls 42 and 60 in the form of frusto-conical caps, and by the flexible membrane 66. Then the carcass is partially shaped (see FIGURE 3) by reciprocally and symmetrically approaching the caps 42 and 60 with respect to the drum midline. The approach of these elements is carried out by actuating the motor 73 which, through the wheels 71, 70 and 69, and the chain 72, imparts rotation to the shafts 55 and 56. The rotation of these shafts causes outward displacement of the nut screws 62, 63 and 51, 52, which in turn causes longitudinal sliding of the hollow mandrels 41 and 58 in opposite directions, and consequently the reciprocal approach of the frusto-conical caps 42 and 60. While these two caps are reciprocally approached, compressed air is injected inside the drum through the hole 67, the mandrel 41 and the hole 68. The membrane 66 thus assumes a toroidal shape and the carcass 74, superposed to it, is partially shaped. The carcass 74 at this stage has a diameter smaller than that of the finished tire and its beads are spaced farther apart than they will be after final shaping.

The drum is now rotated by actuating the motor 49 which, through the pulleys 48 and 45 and the belt transmission 47, places into rotation the mandrels 41 and 58 connected by means of the key 59. During the rotation of the drum, the strips of the sidewalls 76 are turned up about themselves, (see FIG. 3) and the underlying strips of non-adhesive material are detached. At this stage the motor 49 is stopped and the bells 33 and 34 are reciprocally approached by actuating the motor 27 which, through the motor speed reducer 25, the joint 24, the sprocket wheels 19 and 20 and the chain 18, causes the carriages 4 and 5 to slide along the rails 2 and 3. The bells 33 and 34 are brought to a preselected spaced apart position so as to define a separating annular band between the annulus bands 35 and 36 of the bells 33 and 34 (see FIG. 4). The motor 27 is stopped and the shaping of the carcass 74 is completed by again slightly approaching the frusto-conical caps 42 and 60 and by injecting a further amount of compressed air inside the drum, as described above. The expansible drum is again rotated by actuating the motor 49, and the annular reinforcing structure 77, in the form of a strip, is applied between the steps 37 and 38 formed on the outer surface of the bells 33 and 34, causing it to adhere to the annular band of the carcass 74 visibly disposed between the bells 33 and 34. Then the tread band 78 is applied on this assembly, joining the edges of each element to one another (see FIG. 4).

The motor 49 is again stopped and the bells 33 and 34 are spread apart by actuating the motor 27 in the opposite sense, and both the reinforcing structure 77 and the tread band 78 are caused to adhere to the outer surface of the carcass 74 by means of a conventional stitching device R operated in the direction of the decreasing diameters (see FIG. 5). Finally, the edges of the sidewalls 76, previously turned up about themselves, are turned up on the sides of the tread band 78 and are stitched towards the increasing diameters of the carcass so as to adhere to the tread band 78 (see FIG. 6).

However, if in the finished tire, the sidewalls 76 are to be partially covered by the tread band, the above described method is simplified.

The carcass 74, built up on the conventional rigid drum 75 and already provided with the sidewalls, without the interposition of strips of non-adhesive material, is assembled on the expansible drum constituted by the two frusto-conical caps 42 and 60 and by the membrane 66. Then the carcass is completely built up by injecting compressed air inside the drum through the hole 67 and by reciprocally and symmetrically approaching, with respect to the drum midline, the caps 42 and 60, by actuating the motor 73 and the bells 33 and 34, and by actuating the motor 27 so as to leave a separating annular band between the two bells 33 and 34. The motors 73 and 27 are stopped and the motor 49 is actuated to impart rotation to the drum. The annular reinforcing structure 77 in the form of a strip is applied between the steps 37 and 38 of the bells 33 and 34 and is caused to adhere to the annular band of the carcass 74 accessible between the two bells, and then the tread band 78 is applied on this assembly, joining the edges of each element to one another. The bells 33 and 34 are spread apart by actuation of the motor 27; both the reinforcing structure 77 and the tread band 78 are caused to adhere to the outer surface of the carcass 74 and the edges of the tread band are caused to adhere to the underlying edges by a conventional stitching device R operated in the direction of the decreasing diameters.

The modified form drum illustrated in FIG. 11 may be used to insert the carcass provided with indeformable beads on the expansible drum and to remove the finished tire therefrom.

The membrane 66 is anchored to the cylindrical cap 42' and to the frusto-conical cap 60'. The maximum diameter of the cap 42' is approximately equal to the minimum diameter of the bead of the carcass 74, said cap being provided with a plurality of radially extending spaced teeth 79, and is coupled with a frusto-conical ring 80 provided with a plurality of radially extending spaced teeth 81. The intervals between two following teeth of the same series are at least equal to the width of the teeth of the other series.

The cap 60' is provided on its outer end with a flange 82, the diameter of which is greater than the minimum diameter of the bead of the carcass 74, and the ring 80 is of a maximum diameter equal to that of the flange 82.

In order to insert or to remove the carcass with respect to the drum shown in FIG. 11, the ring 80 is rotated so that its teeth may mesh with the teeth 79 of the cap 42', and then it is easily removed from said cap.

As it may be clearly deduced from the above description, the method forming the object of the present invention offers the following advantages:

(a) The manufacture of the carcass is very accurate; in fact, with it being carried out on a rigid drum the development of the carcass between its two beads may be maintained constant and closely conforms to the required development, and the obtained carcasses are compact and devoid of air occlusions by virtue of the efficient stitching of the plies against a rigid surface; and (b) The application of the strips of sidewalls while the carcass, still in cylindrical form, is assembled on the rigid drum, may be carried out in a shorter time than necessary when the carcass is in toroidal form.

As regards the machine, the adoption of a chain drive for displacing the bells, besides allowing a number of operations greater than it is possible to carry out by means of pistons, ensures a perfect symmetry in the displacements of said bells, which is particularly important during the completion of the shaping operation of the carcass, since in that way the two bells exert an identical action on opposite sides of the carcass, as well as for the application of the reinforcing structure and of the tread band, which can be perfectly centered.

The elimination of the central shaft, which in the machine disclosed in United States Patents Nos. 2,814,-330 and 2,814,331 supported the coaxial mandrels onto which are secured the drum sides, makes the machine much lighter and cheaper.

The shape of the drum sides, which have a frusto-conical periphery, is particularly advantageous, since the carcass beads, bearing against the frusto-conical surface, are held in place during the shaping of the carcass, whereas in the machines described in the aforesaid United States patents, they have a tendency to detach from their seats.

Furthermore, the adoption of a membrane knurled on its outer surface produces, during the shaping of the carcass, a corresponding knurling on the inner surface of the latter, thus facilitating the expulsion of air trapped between the inner surface of the tire to be cured and the outer surface of the curing bag during the introduction of this in the tire before the curing operation.

What is claimed is:

1. A method of manufacturing pneumatic tires embodying substantially inextensible elements, comprising the steps of building up a carcass on a flat rigid drum; applying sidewalls to the carcass while the carcass is on said flat rigid drum; transferring the carcass to a cylindrical expansible drum; deforming said expansible drum to shape said carcass into a toroidal form; and then applying a substantially inextensible annular reinforcing structure and a tread band to the outer circumference of said carcass.

2. A method as in claim 1, wherein said reinforcing structure and said tread band are applied with the aid of two annular rigid surfaces, the outer diameter of which corresponds to the maximum outer diameter of the shaped carcass, said surfaces adapted to move to a position adjacent said carcass and adapted to provide a guiding support for said reinforcing structure and said tread band.

3. A method as in claim 1, wherein the outer edges of said sidewalls overlap a portion of said tread band.

4. A method as in claim 3, according to which, prior to the application of the sidewalls on the carcass, two strips of non-adhesive material are applied on said carcass and are subsequently partially covered by said sidewalls; and prior to the application of said reinforcing structure and said tread band the sidewalls are partially turned up about themselves in a direction opposite to the midline of the carcass and the two strips of non-adhesive material are removed from the latter; and, after the application of the tread band on the shaped carcass, the sidewalls are turned back so that their edges may be superposed to those of the tread band.

5. A method as in claim 1. wherein the outer edges of said sidewalls are overlapped by a portion of said tread band.

6. A method of manufacturing pneumatic tires embodying substantially inextensible elements, according to which the carcass is conventionally built up and stitched on a rigid drum; two strips of non-adhesive material are applied on said carcass; sidewalls are applied to the carcass partially covering said strips while the carcass is still on said rigid drum; the carcass thus provided with sidewalls is transferred on a cylindrical expansible drum and is shaped and brought to a toroidal form by deformation of the expansible drum; the sidewalls are partially turned up about themselves in a direction opposite to the midline of the carcass and the two strips of non-adhesive material are removed from the latter; the tire is completed with the aid of two annular rigid surfaces, the outer diameter of which corresponds to the maximum outer diameter of the shaped carcass, by superposing to said surfaces a substantially inextensible annular reinforcing structure and a tread band; the annular rigid surfaces are removed and the reinforcing structure and the tread band are caused to adhere to the shaped carcass; and, after the application of the tread band on the shaped carcass, the sidewalls are unwrapped so that their edges may be superposed to those of the tread band.

7. A machine for manufacturing pneumatic tires having substantially inextensible elements comprising a frame, an expansible drum carried by said frame and having upright end members and a tubular expansing membrane having its respective extremities secured in a fluid-tight manner to each end member along a circumference having a diameter less than the outer diameter equal to the maximum outer diameter of the shaped carcass of said tire, means also carried by said frame to approach and spread apart reciprocally and symmetrically with respect to the drum midline, both said end members and said bells, the means which cause displacement of said end members being independent of the means which cause displacement of said bells, one of said drum end members being provided with a first series of spaced teeth which extend radially from its outer surface, and a removable ring coupled with said one of said drum end members and provided with a second series of spaced teeth which extend radially from its inner surface, the intervals between the teeth of said first series being of a width at least equal to that of the teeth of the other series.

8. A machine as in claim 7, wherein said end members are in the form of frusto-conical caps flaring outwardly from said drum, the maximum diameter of said end members being considerably greater than that corresponding to the circumference along which the extremities of the tubular membrane are secured to each end member and being also greater than the minimum diameter of the beads of the tire to be manufactured.

9. A machine as in claim 7, in which one of the drum end members is of a frusto-conical shape and its maximum diameter is greater than the minimum diameter of the beads of the tire to be manufactured, and the maximum diameter of the other end member is substantially equal to the latter diameter, said last-named end member being coupled with a removable ring having a maximum diameter substantially equal to the maximum diameter of the first-named end member.

10. A machine as in claim 7 in which the end members are each supported by a separate hollow mandrel, said mandrels being coaxial and slidable telescopically but being integral with each other during rotation, the inside of one of said mandrels connected with a source of compressed fluid and this mandrel being provided with an inlet communicating the bore thereof with a chamber defined by the inner surface of said membrane and said end members.

11. A machine as in claim 7 in which each of said bells is rotatably assembled on a support coaxial with the expansible drum and is sustained by a carriage mounted on said frame, and means for reciprocally actuating said carriages towards and away from each other.

12. A machine as in claim 7 in which the membrane of the drum is provided with longitudinal knurling on its outer surface.

13. A method as in claim 2, according to which both the annular reinforcing structure and the tread band are wound in the form of a strip about the annular rigid surfaces and their ends are joined to one another.

14. A method as in claim 4, according to which the reinforcing structure and the tread band are stitched against the carcass from the tire midline towards the drum axis, while the sidewalls are then stitched in the opposite direction.

References Cited

UNITED STATES PATENTS

| | | | |
|---|---|---|---|
| 1,869,656 | 8/1932 | Black | 156—415 |
| 2,814,330 | 11/1957 | Vanzo et al. | 156—410 |
| 2,878,856 | 3/1959 | Pacciarini | 156—400 |
| 2,986,196 | 5/1961 | Frazier | 156—415 |
| 3,035,629 | 5/1962 | Vanzo et al. | 156—416 |
| 3,047,450 | 7/1962 | Drakeford et al. | 156—416 X |
| 3,063,491 | 11/1962 | Mitchell | 156—410 |
| 3,111,444 | 11/1963 | Pouilloux | 156—416 |
| 3,138,510 | 6/1964 | Hindin et al. | 156—416 X |
| 1,428,419 | 9/1922 | DeMattia | 156—123 X |

EARL M. BERGERT, *Primary Examiner.*